United States Patent Office 3,757,018
Patented Sept. 4, 1973

3,757,018
PROCESS FOR CHLORINATING CYANURIC ACID
Raymond N. Mesiah, Somerset, N.J., asssignor to FMC Corporation, New York, N.Y.
No Drawing. Filed June 1, 1971, Ser. No. 149,035
Int. Cl. C07d 55/42
U.S. Cl. 260—248 C                6 Claims

ABSTRACT OF THE DISCLOSURE

An improvement in a 2-stage chlorination process for the production of chlorinated cyanuric acid is provided. The basic 2-stage chlorination process as described in U.S. Pat. 2,969,360 is improved substantially by raising the pH in the primary or first reaction zone to a pH of about 12 or higher. This raising of pH is contrary to the teaching of the prior art, and results in an improved commercial process.

DESCRIPTION OF THE PRIOR ART

Chlorinated cyanuric acid is currently commercially produced by reacting an aqueous alkali, cyanuric acid and chlorine in a 2-stage chlorination process under controlled temperature and pH conditions. U.S. Pat. 2,969,360, issued to Richard Westfall et al., describes such a 2-stage chlorination process suitable for the commercial production of chlorinated cyanuric acid. This 2-stage process has achieved commercial success because of certain advantages obtained when operating under controlled pH and temperature conditions as described in the patent. The more important advantages are:

(a) High chlorinated cyanuric acid yields.
(b) Low chlorine and aqueous alkali losses.
(c) Essentially no by-product formation, e.g. lachrymatory by-products.
(d) High reaction rates.
(e) Product selectivity, either essentially pure di- or tri-chloroisocyanuric acid or preselected mixtures thereof can be produced.

U.S. Pat. 2,969,360 teaches that to obtain these advantages it is imperative for the pH within the first stage or primary reaction zone to be below 9.

The prior 2-stage chlorination process is usually practiced by continuously feeding an aqueous alkali, cyanuric acid and chlorine into a primary reaction zone maintained at a pH between 5 and 9 and at a temperature between 5° and 40° C. The product from the primary reaction zone is partially chlorinated cyanuric acid which is continuously fed into a secondary reaction zone along with sufficient additional chlorine to maintain the pH of the secondary reaction zone between 1.5 and 3.5. The temperature of the secondary reaction zone is maintained between 5° and 20° C. A product slurry containing the desired chlorinated cyanuric acid product is obtained from this secondary reaction zone. The solid chlorinated cyanuric acid product is usually separated from this slurry and the solids washed and dried. The degree of chlorination of the product can be controlled. Dichloroisocyanuric acid, trichloroisocyanuric acid or predetermined mixtures thereof can be obtianed by feeding the aqueous alkali and cyanuric acid into the primary reaction zone in a molar proportion preselected to yield the desired product. When this molar proportion is about 2:1, dichloroisocyanuric acid product is obtained. When the molar proportion is about 3:1, trichloroisocyanuric acid product is obtained. Product mixtures of di- and tri-chloroisocyanuric acids are obtained when this molar ratio is preselected between 2 and 3.

When the degree of chlorination is controlled by regulating the mole ratio of aqueous alkali to cyanuric acid contained in the feed to the primary reaction zone, the pH within the primary reaction zone is controlled by regulating the addition of chlorine.

U.S. Pat. 2,969,360 teaches that the efficiency of the 2-stage chlorination process is maximized and the production of dangerous side-products substantially avoided when the pH within the primary reaction zone is maintained at 9 or lower, and the pH within the secondary reaction zone is maintained between 1.5 and 3.5.

Certain difficulties are encountered during commercial operation of the 2-stage chlorination process described in U.S. Pat. 2,969,360. The pH of the contents in the primary reaction zone is very sensitive to slight changes in the amount of chlorine within the pH range of between about 6.5 and 9. Slight changes in the amount or chlorine cause rapid changes in pH. Maintaining the pH in the primary reaction zone below 9 and preferably between 6.5 and 8.5 has therefore proven to be very difficult in commercial operation. Because of the sensitivity of pH to small changes in the amount of chlorine present, and as a practical matter in commercial operation the pH often strays to between 9 and 10, sometimes approaching as high as 11. This results in decreased process efficiency, some decomposition of the cyanuric acid, the evolution of $CO_2$ and $N_2$ and the consumption of additional caustic and chlorine as predicted in U.S. Pat. 2,969,360 in column 3, lines 5–13.

Although U.S. Pat. 2,969,360 correctly teaches that the contents of the primary reaction zone is very sensitive to changes in the amount of chlorine within the pH range of 6.5 to 8.5 (last paragraph, column 3) the difficulties encountered commercially due to this sensitivity were not foreseen or suggested by U.S. Pat. 2,969,360.

SUMMARY OF THE INVENTION

An improvement in a 2-stage chlorination process for the production of chlorinated cyanuric acid is provided by my invention.

In a 2-stage chlorination process of the type described in U.S. Pat. 2,969,360, in which process efficiency is taught to decrease and other process advantages to be substantially lost as the pH within the primary reaction zone rises above 9, I have discovered that this decrease in process efficiency surprisingly is reversed and other process advantages substantially regained if the pH within the primary reaction zone is maintained above 12. Furthermore, at this high pH the contents of the primary reaction zone are not extremely sensitive to slight changes in the amount of chlorine used to regulate the pH and therefore a pH of above 12 can be easily maintained in a commercial operation.

DETAILED DESCRIPTION OF THE INVENTION

An improvement in a 2-stage chlorination process for the production of chlorinated cyanuric acid is provided by my invention. The basic process which is improved by my invention is described in U.S. Pat. 2,969,360, issued to Richard H. Westfall et al., which patent is hereby incorporated by reference. Specifically, the process of 2,969,360 calls for in a 2-stage chlorination process for the production of chlorinated cyanuric acid, reacting cyanuric acid, an aqueous alkali in a controlled molar proportion relative to the cyanuric acid, and chlorine in a primary reaction zone in which the pH is maintained between 5 and 9 and the temperature between 5° C. and 40° C., then reacting a reaction mixture from the primary reaction zone with additional chlorine in a secondary reaction zone in which the pH is maintained between 1.5 and 3.5 and the temperature between about 5° C. and 20° C. The desired chlorinated cyanuric acid product is withdrawn from the secondary reaction zone. The improvement of this invention comprises maintaining the pH within the primary reaction zone above 12.

Although the advantages of the basic 2-stage chlorination process for the production of chlorinated cyanuric acid are substantially lost when the pH within the primary reaction zone increases slightly above 9, these advantages are surprisingly regained, contrary to what would be expected from the teaching and indications of U.S. Pat. 2,969,360, when the pH within the primary reaction zone is maintained above 12. Furthermore, an additional, important commercial advantage is obtained by maintaining the pH within the primary reaction zone above 12; namely, the process is capable of continuous production of commercial quantities at a pH within the primary reaction zone which maximizes process efficiency and other process advantages and which pH can be easily controlled in commercial operation. Although high process efficiencies and high reaction rates are obtained when the pH within the primary reaction zone is maintained between 6.5 and 9, it was very difficult to operate commercially within such a pH range because of the high sensitivity of the contents of the primary reaction zone to rapid changes in pH within the range of 6.5 to 9. Because of this sensitivity, the pH within the primary reaction zone actually often strayed to 9–10 in commercial operation.

I have discovered an efficient process more adapted to large scale, commercial operations despite the indications of the prior art. Specifically, I have discovered by employing a pH of above 12 in the primary reaction zone, the advantages of the 2-stage chlorination process described in U.S. Pat. 2,969,360 are regained. This invention has significant commercial importance because an increase of a few percent in process efficiency in a commercial operation is very important to the economics of the process.

The process of this invention must be carried out in two steps or stages. In addition, it is desirable to accurately control the molar ratio of alkali to cyanuric acid feed to the primary reaction zone. Therefore, the alkali and cyanuric acid are preferably premixed in the desired molar ratio and the mixture fed into the primary reaction zone. The pH of the primary reaction zone is preferably controlled by regulating the rate at which chlorine is separately added to it.

The reactants which are fed into the primary reaction zone or first stage of the chlorination process therefore are cyanuric acid, approximately the theoretical quantity of caustic alkali equivalent to the number of chlorine atoms to be attached to the cyanuric acid, and sufficient chlorine to maintain the pH above about 12, preferably between 12 and 12.4 and more preferably as close to 12 as possible, e.g. between 12 and 12.1. However, reasonable process efficiencies are obtained with a pH slightly less than 12, e.g. 11.8.

When making dichloroisocyanuric acid by the process of my invention the amount of chlorine fed into the primary reaction zone to maintain the pH above 12 is about 25% of the total chlorine utilized in both stages. This chlorine may be obtained partially from the vent gases from the secondary reaction zone and partially from a source of fresh chlorine, or all of the chlorine required can be fed into the secondary reaction zone and the excess or vent gases from the secondary reaction zone can be fed into the primary reaction zone as its source of chlorine.

The process may be operated either batchwise or continuously. To operate the process continuously, the reaction mixture contained in the primary reaction zone can be built up by initially starting with water in the primary reaction zone and feeding the reactants in their proper proportions or an initial batch charge of the reactants can be added to the primary reaction zone to begin the continuous reaction.

The process of this invention can be practiced continuously as follows. In the first stage of the chlorination there is fed into the primary reaction zone cyanuric acid, the theoretical quantity of aqueous alkali equivalent to the chlorine to be substituted and sufficient chlorine to maintain the pH within the primary reaction zone above about 12. Primary reaction mixture overflows from the primary reaction zone and is fed to the secondary reaction zone along with fresh chlorine. Here the chlorine feed is adjusted so that the pH is maintained between 1.5 to 3.5. In this pH range the solubility of chlorinated cyanuric acid in the reaction liquor is low and yet the absorption of chlorine is sufficiently rapid so that the chlorination goes essentially to completion with the precipitation of the desired chlorinated cyanuric acid.

Alternately, the process of this invention can be practiced batchwise as shown in Example 2 hereinafter.

The chlorination reaction can be run effectively at any temperature up to about 40° C. However, it is preferred to maintain the temperature below 20° C. to speed up chlorine absorption and minimize side reactions. The chlorinated cyanuric acid product is a precipitate in a slurry obtained from the secondary reaction zone. Usually this precipitated chlorinated cyanuric acid contained in the slurry is separated, washed and dried.

The chlorinated cyanuric acid product produced in the secondary reaction zone is very stable and can be held within the secondary reaction zone for several hours if necessary. The operation of the secondary reaction zone is identical to the operation of the second stage of the process described in U.S. Pat. 2,969,360 since my invention and its unobvious results are obtained by new operating conditions for the primary reaction zone and not the secondary reaction zone.

Any aqueous alkali may be used in the process, but the alkali metal hydroxides are preferred because they do not cause frothing, as do carbonates and they are otherwise most economical. Of the caustic alkalies, caustic soda is preferred for cost reasons. The alkali is used in the process in substantially theoretical quantities because the only alkali lost is a very small amount used up in side reactions, for example a 2.05:1 molar ratio of alkali to cyanuric acid might be employed rather than the theoretical 2.0:1 when making dichloroisocyanuric acid. In operating the process in 2-stages the amount of chlorine absorbed is essentially equivalent to the alkali used and therefore essentially theoretical quantities of chlorine are consumed.

The following examples are illustrations but not limitations of my invention.

Example 1

A 2-stage continuous chlorination process was performed as follows. A 1.7 liter tubular primary reactor was fitted with a thermometer, mechanical stirrer, ice bath, pH electrodes, inlet lines and an overflow port situated so as to give a working volume of 1.2 liters. A secondary reactor was set up identical to the primary reactor except that it had an inlet connected to the overflow port of the primary reactor and an inlet for chlorine. The overflow port from the secondary reactor was connected to a large fritted funnel.

A feed solution was prepared consisting of 200 g. (1.55 mole) of cyanuric acid, 130.4 g. (3.26 mole) of NaOH and 3,800 g. of $H_2O$. This mixture was continuously added to the primary reactor. At the same time chlorine gas was added to the primary reactor at a rate sufficient to maintain the pH within the primary reaction zone at between 12.0 and 12.1. As the primary reactor filled, the contents overflowed into the secondary reactor to which additional chlorine was added in sufficient quantities to maintain the pH within the secondary reaction zone between 2.6 and 3.0. During the chlorination process, the contents of both reactors were maintained at between 16 and 18° C. The hold-up time in each reactor was about 75 minutes. When all of the feed solution had been fed into the primary reactor, the contents of the primary reactor were chlorinated to a pH of 3.0.

The contents of the primary reactor were then combined with the contents of the secondary reactor and filtered. All of the solid product was then washed with water and dried. The solids assayed 71.5% available chlorine (71.6% available chlorine being the theoretical value for dichloroisocyanuric acid). The solids represented an 87.4% by weight yield of dichloroisocyanuric acid based upon the weight of cyanuric acid feed. An especial advantage of this reaction was that control of the pH in the primary reactor within the narrow range of 12.0 to 12.1 was achieved easily.

Example A (Comparative)

The process of Example 1 was repeated except that the pH within the primary reaction zone was maintained between 10.3 and 10.5. The solid product assayed 71.3% chlorine and the yield of dichloroisocyanuric acid was 82.3% by weight based upon the weight of cyanuric acid feed.

Example B (Comparative)

The procedure of Example 1 was repeated except that the pH within the primary reactor was maintained between 8.1 and 8.4 (the process of U.S. Pat. 2,969,360). The product assayed 71.3% available chlorine and the product yield was 87.7% by weight based upon the weight of cyanuric acid feed. Despite close control of the rate of feed of chlorine the pH in the primary reactor varied between 8.1 and 8.5, demonstrating the sensitivity of pH to change in chlorine feed rate, even in easily monitored small scale laboratory equipment.

Example 2

A 2-step batchwise chlorination was performed as follows. A 2 liter reactor fitted with mechanical stirrer, pH electrodes, ice bath, thermometer and chlorine inlet line was used. A 1,200 g. aqueous suspension containing 64.5 g. (0.5 mole) of cyanuric acid and 42 g. (1.05 mole) of sodium hydroxide was added to the reactor and the mixture was cooled to 15° C. The first step of the reaction was performed by adding sufficient chlorine to bring the reactor contents to a pH of 12.17. This first step pH condition was maintained for 3 hours during which time the reactor contents were mixed and maintained at a temperature of 15 to 18° C. After three hours the second step was performed by adding additional chlorine to the reactor to bring the contents to a pH of 3.1 which caused dichloroisocyanuric acid to precipitate. The contents of the reactor were then filtered and the solids washed and dried. The solids and filtrate were analyzed for cyanuric acid values and available chlorine; the solids had 71.1% available chlorine and represented an 88.5% by weight yield of dichloroisocyanuric acid based upon the weight of cyanuric acid feed. Total recovery of cyanuric acid values was 99.7%, demonstrating exceedingly low decomposition.

Comparative Examples C, D and E

The batchwise 2-step chlorination procedure of Example 2 was repeated at pH values for the first step as stated in Table I. Product yield and available chlorine content obtained are also reported in Table I, along with the results for Example 2.

TABLE I

Batch 2-step chlorination

| Ex. No. | First step pH | Percent of $Cl_2$ added to first step | Product Available chlorine | Product Yield of DCCA (percent) | Total recovery of CA (percent) |
| --- | --- | --- | --- | --- | --- |
| II | 12.17 | 23 | 71.1 | 88.5 | 99.7 |
| C | 11.13 | 28 | 69.7 | 71.1 | 96.6 |
| D | 10.09 | 45 | 70.1 | 70.8 | 97.2 |
| E | 8.23 | 64 | 71.3 | 91.8 | 99.8 |

The percent yield of dichloroisocyanuric acid obtained in Example 1 and Example B are essentially the same. Example 1 corresponds to the process of this invention and Example B corresponds to the process of U.S. Pat. 2,969,360. Example A shows the lower yield obtained when the pH in the primary reaction zone increases above 9.0 as predicted by the prior art. However, the process of this invention (Example 1) in addition to maintaining high yields and high reaction rates has the added advantage of being easily controlled in commercial operation. The results of Example 2 and Comparative Examples C, D and E demonstrate that yield and process efficiency decrease as the pH in the primary reaction zone increases above 9.0 and surprisingly that good yields and process efficiency are regained when the pH is maintained above about 12.

Furthermore, the results for the total recovery of cyanuric acid values, 99.7% for Example II and 99.8% for Comparative Example E (process of Pat. 2,969,360), demonstrate that the process of my invention regains high process efficiency with respect to almost no decomposition of cyanuric acid. However, the conditions of my invention which yield high process efficiency can easily be maintained commercially while the process of Comparative Example E tends to stray into the less efficient pH conditions of Comparative Examples C and D when practiced commercially.

The best mode contemplated for practicing this invention is as a 2-stage continuous chlorination process as exemplified in Example 1. That is, by continuously feeding a premixed feed of cyanuric acid and sodium hydroxide into a primary reaction zone to which chlorine is separately added in sufficient quantity to maintain the pH within the primary reaction zone not substantially lower than 12, and as close to 12 as is feasible in plant practice. Operating within the range of 12.0 to 12.3 is preferred with especially good results being obtained at a pH between 12.0 and 12.1. Overflow from the primary reaction zone is fed into a secondary reaction zone along with sufficient additional chlorine to maintain the pH within the secondary reaction zone between 2.6 and 3.0. Both the primary and secondary reaction zones are stirred and sufficient heat is removed from both reaction zones to maintain temperature below 20° C. and preferably between 15° and 18° C. The slurry product that overflows from the secondary reaction zone is filtered, washed and recovered as chlorinated cyanuric acid. Preferably the premixed feed to the primary reaction zone is at a mole ratio of sodium hydroxide to cyanuric acid of either 2:1 or 3:1 depending on whether dichloroisocyanuric acid or trichloroisocyanuric acid product is desired.

What is claimed is:

1. In a 2-stage chlorination process for the production of chlorinated cyanuric acid comprising: (a) reacting cyanuric acid, an aqueous alkali metal hydroxide in a controlled molar proportion relative to the cyanuric acid, and chlorine in a primary reaction zone in which the temperature is between 5° C. and 40° C., (b) reacting the reaction mixture from said primary reaction zone with additional chlorine in a secondary reaction zone in which the pH is maintained between 1.5 and 3.5 and the temperature between 5° and 20° C., and (c) withdrawing a chlorinated cyanuric acid product from said secondary reaction zone; the improvement comprises maintaining the pH within said primary reaction zone above 12 whereby this reaction is rendered easily controllable without sacrificing efficiency and yield.

2. The process of claim 1 in which the pH within the primary reaction zone is maintained between 12 and 12.4.

3. In a 2-stage continuous chlorination process for the production of chlorinated cyanuric acid, comprising feeding cyanuric acid, aqueous alkali metal hydroxide in a molar ratio to the cyanuric acid corresponding to the number of chlorine atoms to be attached to the cyanuric acid, and a separate stream of chlorine to an aqueous reaction zone in which the temperature is maintained between 5° C. and 40° C., withdrawing a portion of the resulting reaction mixture and feeding it, with additional chlorine, to a second reaction zone in which the pH is maintained between 1.5 and 3.5 and the temperature between about 5° C. and 20° C., withdrawing reaction product from the second reaction zone and recovering the precipitated chlorinated cyanuric acid from the withdrawn reaction mixture, wherein the improvement comprises maintaining the pH within the aqueous reaction zone above 12.

4. The improvement of claim 3 in which the pH within the aqueous reaction zone is between 12 and 12.4.

5. The process of claim 1 in which the aqueous alkali metal hydroxide in (a) is in a molar proportion of about 2:1 relative to the cyanuric acid, and the chlorinated cyanuric acid product withdrawn at (c) is dichlorocyanuric acid.

6. The process of claim 3 in which the aqueous alkali metal hydroxide is in a molar ratio of about 2:1 to the cyanuric acid, and dichlorocyanuric acid is the product recovered.

References Cited

UNITED STATES PATENTS

| | | | |
|---|---|---|---|
| 3,073,823 | 1/1963 | Merkel et al. | 260—248 |
| 3,178,429 | 4/1965 | Vazopolos | 260—248 |
| 3,534,033 | 10/1970 | Kagawa et al. | 260—248 |

JOHN M. FORD, Primary Examiner